Figure 1:
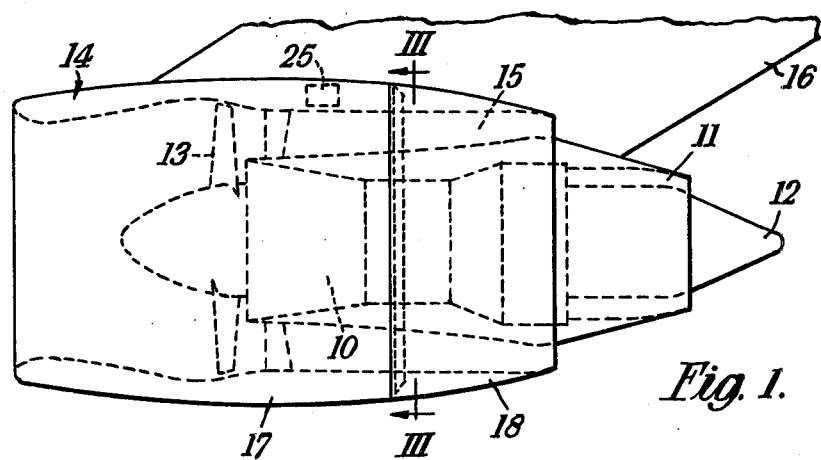

United States Patent [19]

Montgomery

[11] 4,145,877
[45] Mar. 27, 1979

[54] ACTUATING MECHANISM FOR THE THRUST REVERSAL DOORS OF A GAS TURBINE ENGINE

[75] Inventor: Ronald Montgomery, Belfast, Ireland

[73] Assignee: Short Brothers & Harland Limited, Belfast, Ireland

[21] Appl. No.: 814,889

[22] Filed: Jul. 12, 1977

[30] Foreign Application Priority Data

Jul. 13, 1976 [GB] United Kingdom ............. 29143/76

[51] Int. Cl.² ............................................. F02K 3/06
[52] U.S. Cl. .................................. 60/226 A; 60/229; 60/230
[58] Field of Search ................... 60/226 A, 229, 230; 239/265.31

[56] References Cited

U.S. PATENT DOCUMENTS

| | | | |
|---|---|---|---|
| 2,950,595 | 8/1960 | Laucher et al. | 239/265.31 |
| 3,500,645 | 3/1970 | Hom | 60/226 A |
| 3,511,055 | 5/1970 | Timms | 239/265.31 |

Primary Examiner—Robert E. Garrett
Attorney, Agent, or Firm—Cushman, Darby & Cushman

[57] ABSTRACT

A gas turbine engine comprises a casing defining a duct for a thrust producing gas, the casing is divided into an upstream and a downstream portion movable between a normal position form a continuous duct and a thrust reversal position in which the two portions are separated by a gap. A plurality of thrust reversal doors are pivotally connected at or towards one end thereof to the downstream portion and a number of struts and pivotally connected at or towards one end thereof to the upstream portion, the thrust reversal doors and the struts in the normal position and as the upstream and downstream portions move towards the thrust reversal position, extending downstream to leave the duct unobstructed thereby. Each strut so engages a part of one of the thrust reversal doors as the upstream and downstream portions approach the thrust reversal position as to prevent relative movement between said strut and said part to cause all the doors and the struts to pivot together from said retracted position to an extended position reached at the thrust reversal position of the upstream and downstream portions in which the thrust reversal doors close the duct downstream of the gap to cause gas passing through the duct to pass through the gap thereby reversing the thrust of the gas.

13 Claims, 10 Drawing Figures

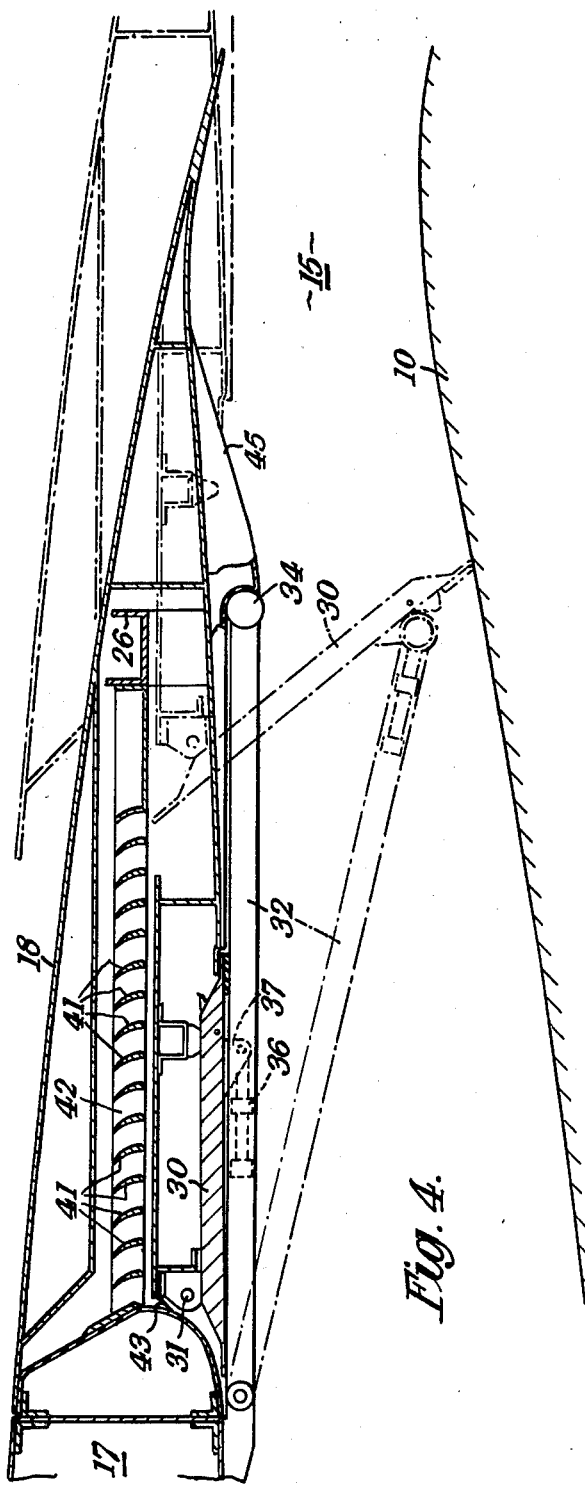
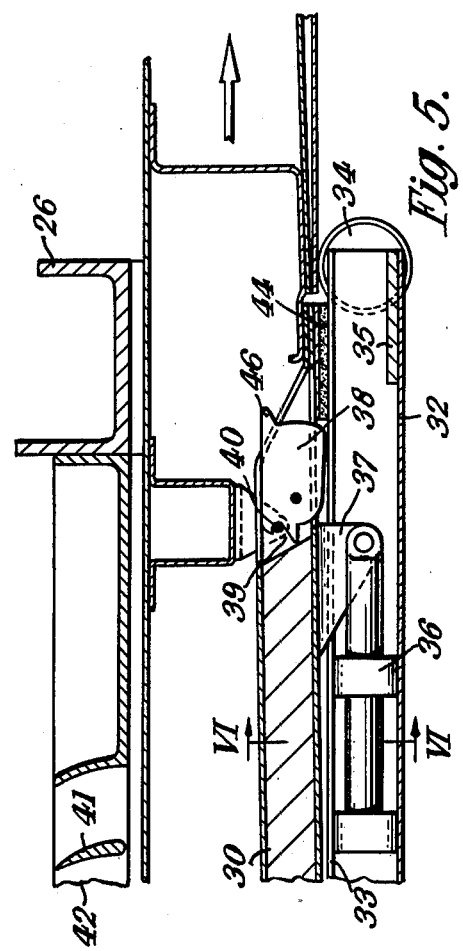
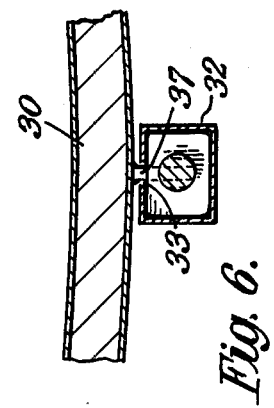
Fig. 4.
Fig. 5.
Fig. 6.

ACTUATING MECHANISM FOR THE THRUST REVERSAL DOORS OF A GAS TURBINE ENGINE

The invention relates to gas turbine engines of the kind comprising a casing defining duct for thrust producing gas, the casing being divided into an upstream portion and a downstream portion which are relatively movable between a normal position in which the two portions abut to form a continuous duct and a thrust reversal position in which the two portions are separated in the direction of the length of the duct by a gap. A plurality of thrust reversal doors are provided which, as the upstream and downstream portions are moved from the normal position to the thrust reversal position are pivoted from a retracted position in which they leave the duct unobstructed or substantially unobstructed to an extended position which they reach at the thrust reversal position of the upstream and downstream portions and in which they close or substantially close the duct downstream of the gap to cause, in use, gas passing through the duct to pass through the gap thereby reversing the thrust of the duct.

One previous proposal for moving the thrust reversal doors of gas turbine engines of this kind between the retracted position and the extended position comprises a fixed guide for each thrust reversal door mounted on the upstream portion and extending downstream thereof. Each thrust reversal door is carried on rollers which engage in a corresponding guide to hold the associated thrust reversal door in a retracted position while the upstream and downstream portions are in the normal forward thrust position and as their movement towards the thrust reversal position commences. As the upstream and downstream portions approach the thrust reversal position, the rollers enter a shaped section of the guide which causes the associated thrust reversal door to move from the retracted position to an extended position in which the duct is closed and thrust reversed.

It is a disadvantage of such a previous proposal that, since the thrust reversal doors are cantilevered from the rollers and the guides cantilevered from the upstream portion, towards the extended position of the doors a large load is imposed on both the doors and the guides. In addition, this cantilevering of the doors requires a large force from the downstream portion to the doors to move them from the extended position to a retracted position. Since the thrust reversal doors are unsupported along the greater part of their length, they tend to move relatively to the guides and the downstream portion particularly as they are intermediate the retracted and extended positions and may also be unstable in the extended position.

It is an object of the invention to provide a gas turbine engine of the kind referred to in which movement of the thrust reversal doors is effected simply and securely with the doors held firmly in the extended position and supported during their movement between the retracted and extended positions.

Accordingly, the invention provides a gas turbine engine comprising a casing defining a duct for a thrust producing gas, the casing being divided into an upstream and a downstream portion which are relatively movable between a normal position in which the two portions abut to form a continuous duct and a thrust reversal position in which the two portions are separated in the direction of the length of the duct by a gap, a plurality of thrust reversal doors pivotally connected at or towards one end thereof to the downstream portion and a number of struts pivotally connected at or towards one end thereof to the upstream portion, the thrust reversal doors and the struts in the normal position of the upstream and downstream portions and as the upstream and downstream portions move towards the thrust reversal position, extending downstream or substantially downstream of the downstream and upstream portions respectively to leave the duct unobstructed or substantially unobstructed thereby, each strut so engaging a part of one of the thrust reversal doors spaced downstream of said pivotal connection of said thrust reversal door as the upstream and downstream portions approach the thrust reversal position as to prevent relative movement between said strut and said part to cause all the doors and the struts, on continued movement of said upstream and downstream portions to said thrust reversal position, to pivot together from said retracted position to an extended position reached at the thrust reversal position of the upstream and downstream portions in which the thrust reversal doors close or substantially close the duct downstream of the gap to cause, in use, gas passing through the duct to pass through the gap thereby reversing the thrust of the gas.

The struts of the engine of the invention provide the required degree of support. They are comparatively simple in construction and enable a ready and smooth reversal of thrust to be achieved.

Figure 2:
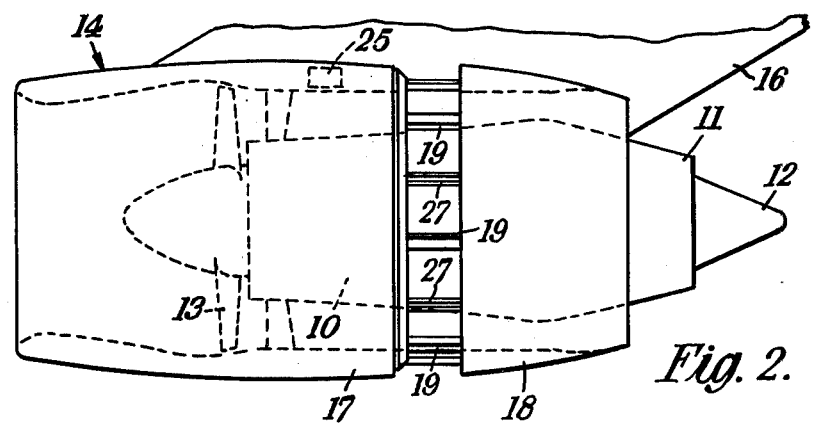
Figure 10:
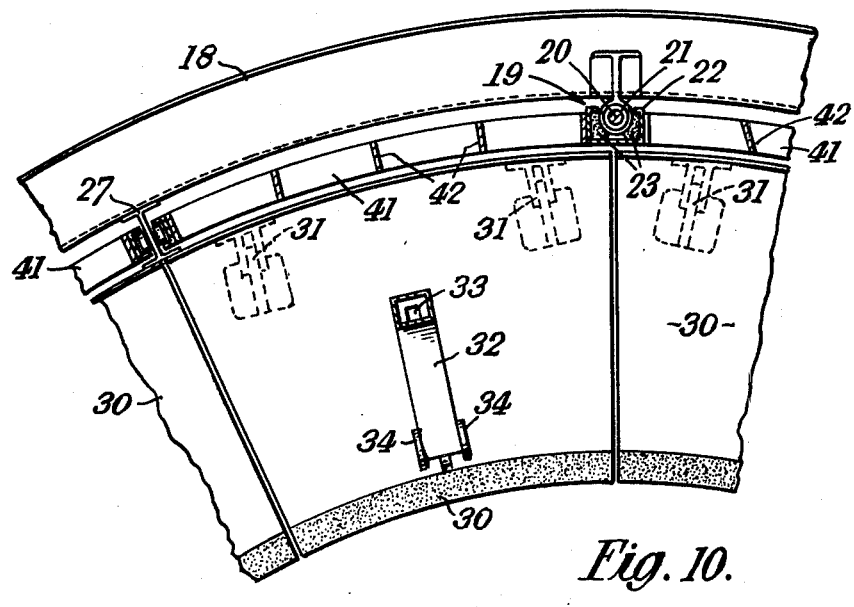
Figure 3:
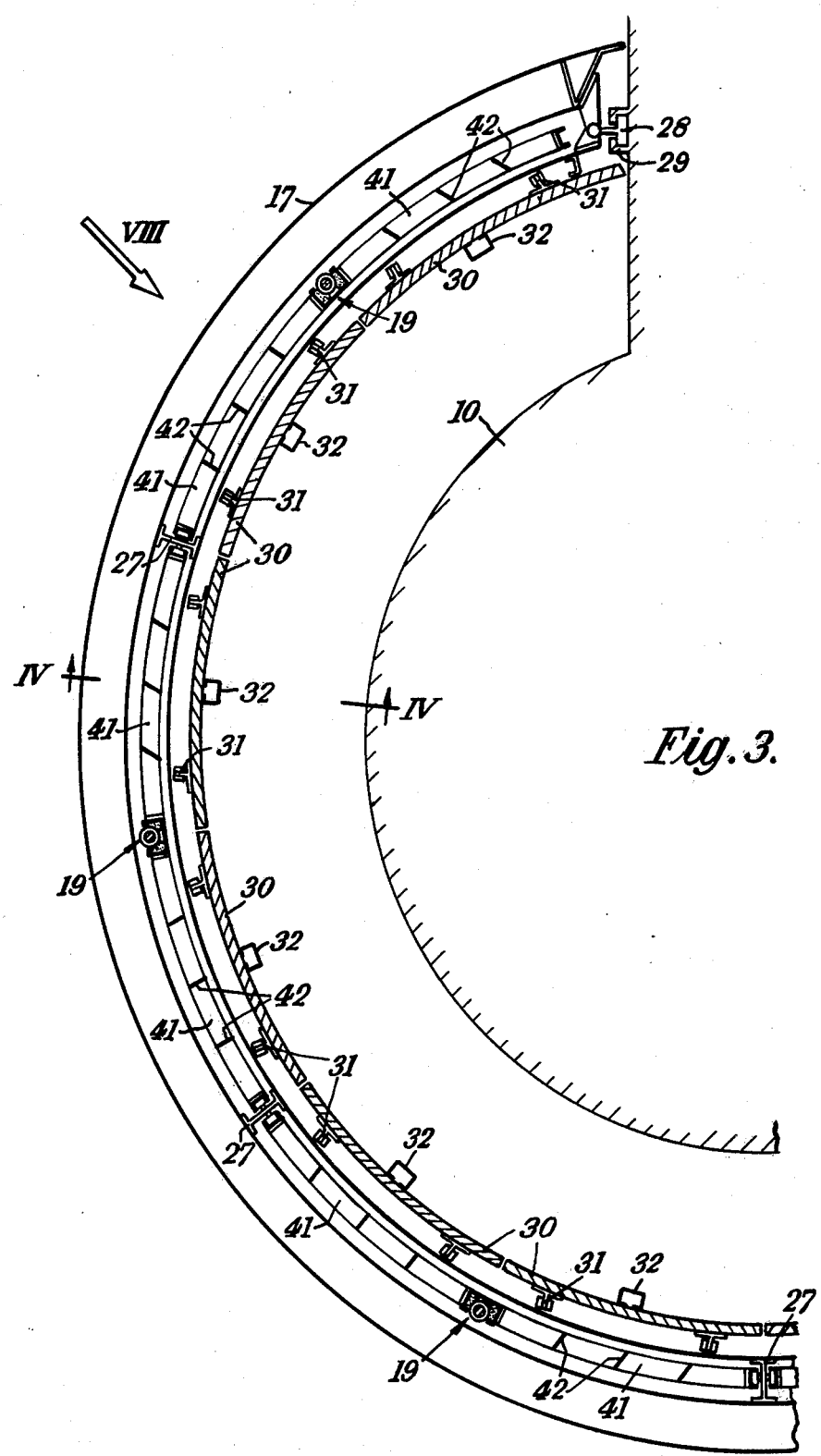
Figure 7:
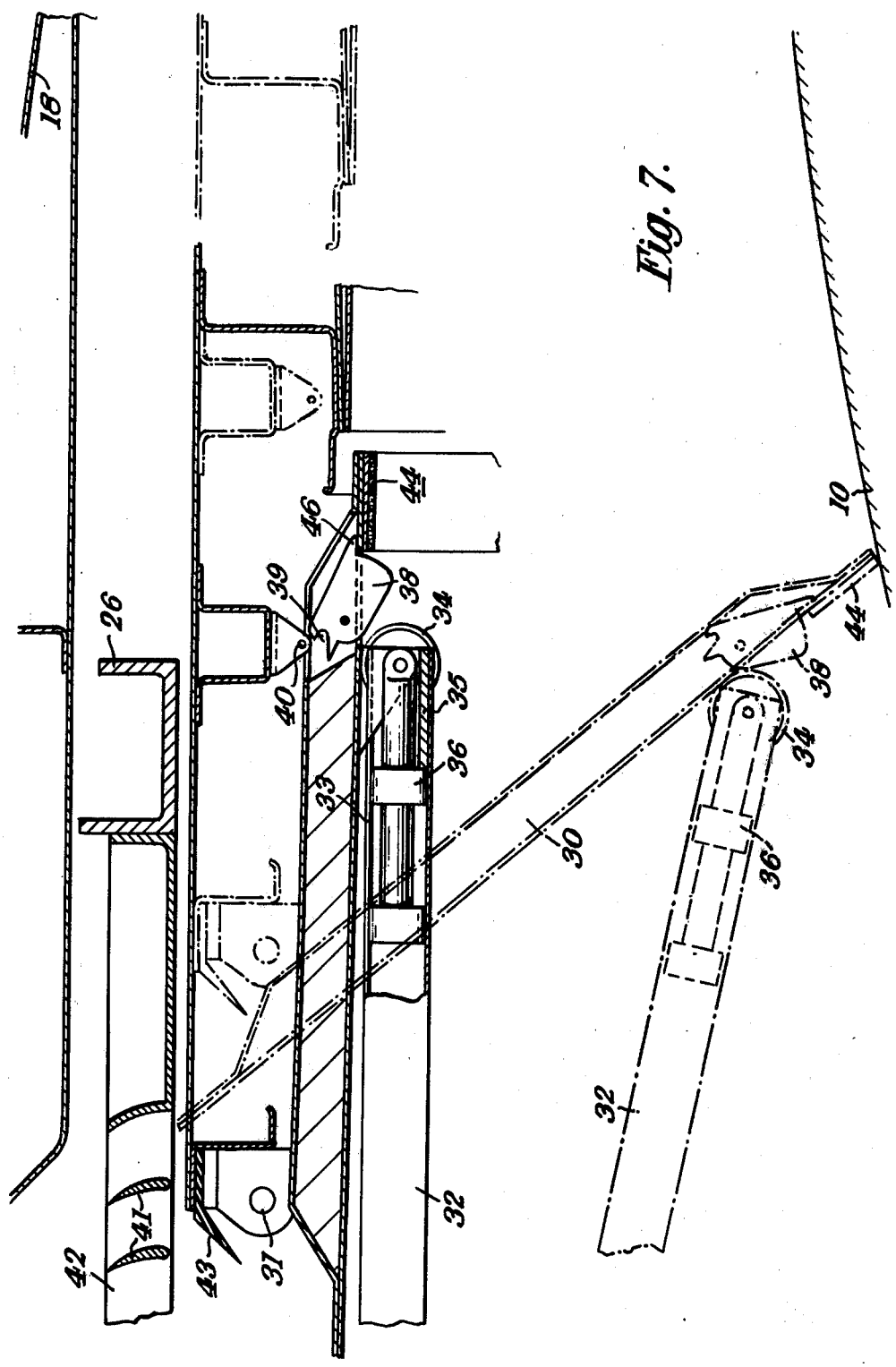
Figure 8:
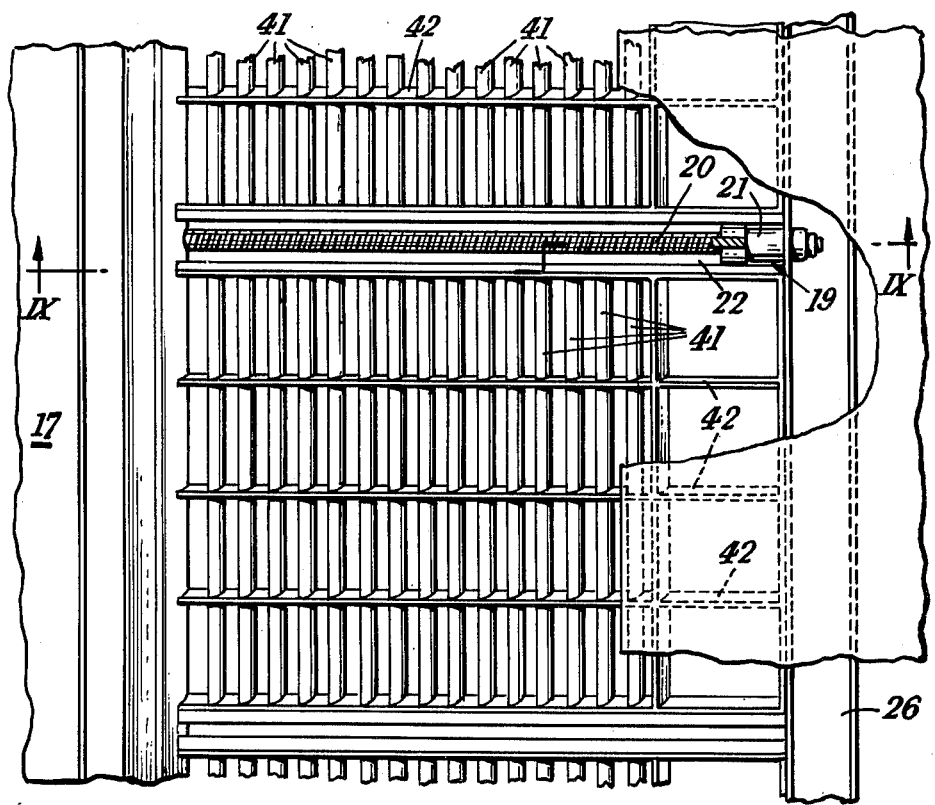
Figure 9:
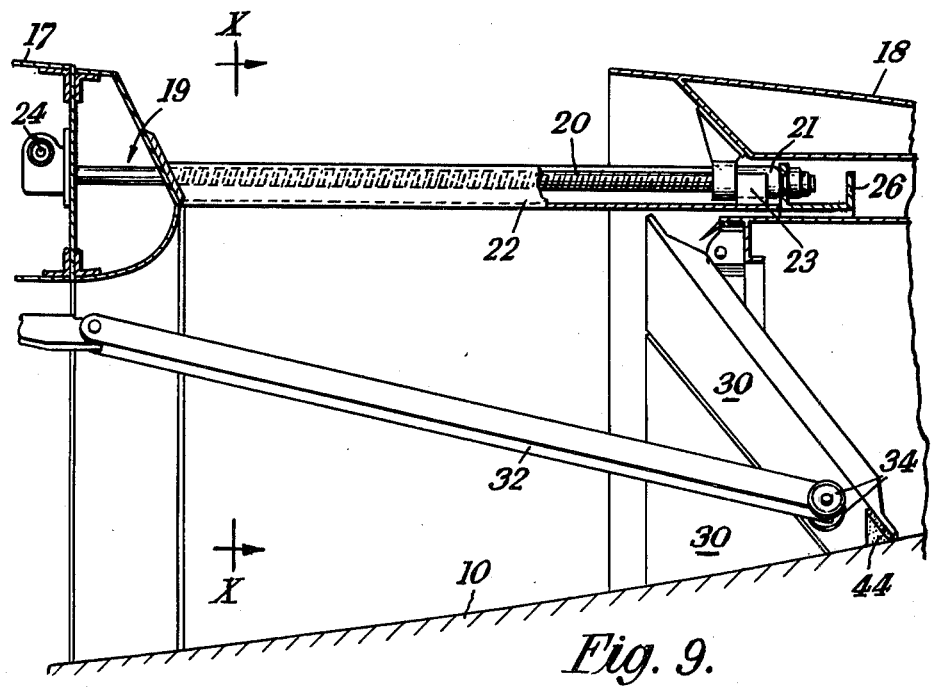

The following is a more detailed description of one embodiment of the invention, by way of example, reference being made to the accompanying drawings in which:

FIG. 1 is a side elevation of a gas turbine engine in a normal forward thrust position, FIG. 2 is a side elevation of the engine of FIG. 1 in a thrust reversal position, FIG. 3 is a half of a cross-section on the line III—III of FIG. 1, the other half of the section corresponding, FIG. 4 is a section on the line IV—IV of FIG. 3, FIG. 5 is an enlarged view of a fragment of FIG. 4, showing a thrust reversal door of the gas turbine engine just before release, FIG. 6 is a section on the line VI—VI of FIG. 5, FIG. 7 is a similar view to FIG. 5 showing the thrust reversal door just after release and, in chain dotted lines, the thrust reversal door in a thrust reversing position, FIG. 8 is a view looking in the direction of the arrow VIII in FIG. 3, but with the gas turbine engine in a thrust reversal position, FIG. 9 is a section on the lines IX—IX of FIG. 7 and FIG. 10 is a section on the line X—X in FIG. 9.

Referring first to FIGS. 1 and 2, the gas turbine engine comprises an engine core 10 including compressor section, a combustion section, a turbine section and an exhaust defined between a casing 11 of the engine core and a centre body 12. The engine drives a front fan 13 which is encased within a fan casing 14 which, with the casing 11 of the engine core defines a by-pass duct 15 for by-pass air from the front fan. The gas turbine engine is connected to a wing of an aircraft by a pylon 16.

The fan casing is divided into an upstream portion 17 and a downstream portion 18. The downstream portion 18 is connected to the upstream portion by six linear travel actuators 19, as best seen in FIGS. 2 and 3. Referring additionally to FIGS. 8 and 9, each linear travel actuator comprises a screw 20 in threaded engagement with a nut 21 connected to the downstream portion and sliding in a square cross-section guide 22 in which the nut is held by packing 23 (see FIGS. 3 and 9). The guides are connected between the upstream portion 17 and an annular support ring 26. All the screws 20 are driven in synchronism by a cable 24 (see FIG. 9) whose operation is controlled by a control device 25 (see FIG. 1).

As best seen in FIGS. 3 and 8, five guide beams 27 extend between the upstream portion 17 and the support ring 26. The edges of the downstream portion adjacent the pylon 16 carry runners 28 which engage in associated guides mounted on the pylon 16, as seen in FIG. 3.

Referring next to FIGS. 3, 4, 7 and 10, twelve thrust reversal doors 30 are connected at upstream ends thereof to the downstream portion 19 for pivotal movement about axes tangential to an imaginary circle coaxial with the axis of the duct lying in a plane normal to the axis of the duct. The pivotal connections are indicated at 31 in FIGS. 3, 7 and 9. Each thrust reversal door is in the shape of a segment of a cone whose larger diameter is substantially the diameter of the interior of the fan casing 14 and whose smaller diameter is substantially the diameter of the casing 11 of the core.

Twelve struts 32 are provided, one associated with each thrust reversal door, as best seen in FIGS. 3, 4, 5, 6, 9 and 10. Each strut is connected at a leading end thereof to the upstream portion 17 for pivotal movement about an axis parallel to the pivotal axis of the associated thrust reversal door 30. Each strut 32 is formed by a hollow tube of square cross-section having a longitudinally extending slot 33 (see FIG. 6) extending along its radially outermost wall. Two rollers 34 are provided at a trailing end of each strut and are mounted for rotation about an axis parallel to the pivotal axis of the associated strut 32. A stop 35 is provided at the trailing end of each strut within the strut for a purpose described hereinafter (see FIG. 5).

Referring next to FIGS. 4, 5 and 6, each thrust reversal door 30 has a strut engaging part 36 connected thereto by a triangular plate 37 towards the trailing end thereof for pivotal movement about an axis parallel to the pivotal axis of the associated thrust reversal door 30. Each strut engaging part 36 comprises a piston which slides in and is guided by the interior of the associated strut 32. The triangular plate 37 the slot 33 in the associated strut 32.

Each thrust reversal door 30 carries at the trailing end thereof a latch plate 38 as best seen in FIG. 5. The latch plate 38 is pivotally mounted on the associated door and includes a recess 39 which, in the position shown in FIG. 5, engages with a corresponding pin 40 carried by the downstream portion 18. The co-operation between the pin 40 and the recess 39 tends to pivot the latch plate 38 about its pivotal axis but such pivoting is resisted by engagement of the latch plate 38 with the radially outermost wall of the associated strut 32. This co-operation between the latch plate 38 and the pin 40 holds the associated thrust reversal door in a retracted position shown in full line in FIG. 4 and in FIGS. 3, 5 and 7.

As best seen in FIGS. 3, 4, 8 and 10, twelve arcuate cascade trays are provided and are connected to the actuator guides 22, the ring 26 and the guide beams 27. Each cascade tray comprises a plurality of arcuate guide vanes 41 each lying in a plane normal to the axis of the duct. The arcuate guide vanes 41 are interconnected by parallel longitudinal guide vanes 42 extending in a direction parallel to but spaced from the axis of the duct for a purpose to be described hereinafter.

As best seen in FIG. 7, a seal 43 is provided at the upstream end of the downstream portion 18 and abuts the downstream end of the upstream portion 17 in the normal forward thrust position of the gas turbine engine. A further seal 44 is provided at the downstream edge of each thrust reversal door 30 for a purpose described hereinafter.

In use, in the normal forward thrust position of the gas turbine engine shown in FIGS. 1, 3 and full line in FIGS. 3 and 7 the downstream portion 18 abuts the upstream portion 17 to form a continuous by-pass duct 15. The thrust reversal doors 30 extend in a retracted position parallel or substantially parallel to but spaced from the axis of the duct 15. They are held in this position by the engagement of the latch plates 38 with the corresponding pins 40. The struts 32 also extend parallel or substantially parallel to but spaced from the axis of the duct 15 in a retracted position and the trailing ends of the struts 32 are received within a shaped recess in a fairing 45 (see FIG. 4). In this normal forward thrust position, air from the front fan 13 passes through the by-pass duct 15 unobstructed or substantially unobstructed by the struts 32 and the thrust reversal doors 30.

In order to reverse the thrust of the gas turbine engine, the control device 25 is actuated to rotate the cable 24 causing corresponding simultaneous rotation of the screws 20 of the linear travel actuators 19. The nuts 21 are accordingly moved in a downstream direction towards a thrust reversal position. During this movement, the thrust reversal doors 30 and the associated struts 32 are maintained in the retracted position by engagement of the pins 40 with the latch plates 38 as best seen in FIG. 5.

As the upstream and downstream portions 17 18 approach thrust reversal position in which the two portions are separated in the direction of the length of the duct 15 by a gap see FIG. 2, the strut engaging parts 36 abut the stops 35 as best seen in FIG. 7. Accordingly, further relative movement between the parts 36 and the struts 32 is prevented. This is seen in FIG. 7. At the same time, the latch plates 38 move beyond the end of the associated struts 32 and thus are no longer prevented from being pivoted by the pins 40 mounted on the downstream portion 18. Accordingly, the latch plates 38 pivot to release the pins 40 from the recesses 39, pivoting of the latch plates 38 being limited by abutments 46 on the latching plates engaging with the corresponding thrust reversal doors 30.

Thus the thrust reversal doors 30 are free to pivot on their pivotal connections 31. Continued movement of the downstream portion 18 towards the thrust reversal position by the actuators 19 moves the pivotal connections 31 of the thrust reversal doors 30 in a downstream direction but since the strut engaging parts 36 are prevented from movement relatively to their associated struts 32, the thrust reversal doors 30 and the associated struts 32 are caused to pivot about their pivotal connections to the downstream portion 18 and the upstream portion 17 respectively to move the thrust reversal doors 30 into an extended position shown in chain dotted lines in FIGS. 4 and 7 and in FIGS. 9 and 10 in which the trailing edges of the thrust reversal doors 30 abut the casing 11 of the engine core 10 to close or substantially close the duct 15 downstream of the gap between the upstream and downstream portions 17 18.

Accordingly, air from the front fan 13 passing through the by-pass duct 15 is caused to pass through the gap thus reversing the thrust of the air. The arcuate guide vanes 41 divert the air over the exterior of the fan casing 14 towards the front of the engine to assist in thrust reversal and the longitudinal guide vanes 42 divert the air upwards to prevent dust being raised which might be ingested into the engine.

The rollers 34 engage with the doors 30 throughout their relative movement from the normal forward thrust position through the un-latching position to the extended position.

The further seals 44 at the trailing ends of the thrust reversal doors engage with the engine core casing 11 to prevent by-pass air flowing therebetween.

In order to return the engine to a normal forward thrust position, the control 25 is operated to actuate the cable 24 to reverse the direction of rotation of the screws 20 of the linear travel actuators 19. Accordingly, the nuts 21 are drawn back towards the upstream portion 17 moving the downstream portion 18 from the thrust reversal position towards the normal forward thrust position. The pivotal connections 31 of the thrust reversal doors 30 perform this movement also which causes the thrust reversal doors 30 to be withdrawn from the thrust reversal position shown in chain dotted lines in FIGS. 4 and 7 and in FIGS. 9 and 10. As the thrust reversal doors 30 approach the retracted position, the pins 40 engage the upper surfaces of their associated latch plates 38 and ride over them until they are adjacent the associated recesses 38, as shown in FIG. 7. Continued movement of the downstream portion 18 towards the upstream portion 17 commences movement of the strut engaging parts 36 in their associated struts. This relative movement between the thrust reversal doors 30 and the struts 32 forces the under-surfaces of the latch plates 38 into engagement with the radially outermost walls of the struts causing pivoting of the latch plates to engage the pins 40 in the recesses 39. This position is shown in FIG. 5. Accordingly, the thrust reversal doors 30 are held in the retracted position by the latch plates and movement of the downstream portion 18 towards the upstream portion 17 continues until two portions abut as shown in FIG. 4. In this position the engine is in the normal forward thrust position as shown in FIG. 1.

It will be appreciated that the latch plates 38 are not essential and that the geometry of the thrust reversal doors 30 and the struts 32 ensure that the thrust reversal doors and the struts maintain the retracted position in the normal forward thrust position of the engine and that the struts 32 will draw the thrust reversal doors 30 down to the extended position as the downstream portion 18 approaches the thrust reversal position.

It will also be appreciated that the strut engaging parts need not comprise a piston but could comprise rollers or the like.

Alternatively, a guide could be mounted on each thrust reversal door 30 and a guide engaging part be mounted on an associated strut 32 and be in engagement with the guide.

There need not necessarily be as many struts 32 as thrust reversal doors 30. One strut 32 could act on two or more thrust reversal doors 30.

What we claim is:

1. A gas turbine engine comprising a casing defining a duct for a thrust producing gas, the casing being divided into an upstream portion and a downstream portion which are relatively movable between a normal position in which the two portions abut to form a continuous duct and a thrust reversal position in which the two portions are separated in the direction of the length of the duct by a gap, a plurality of thrust reversal doors pivotally connected adjacent one end thereof to the downstream portion and a number of struts pivotally connected adjacent one end thereof to the upstream portion, the thrust reversal doors and the struts, when in the normal position of the upstream and downstream portions and as the upstream and downstream portions move towards the thrust reversal position, extending substantially downstream of the downstream and upstream portions, respectively, to leave the duct substantially unobstructed thereby, each strut being provided with means engaging a part of one of the thrust reversal doors spaced downstream of said pivotal connection of said thrust reversal door as the upstream and downstream portions approach the thrust reversal position, the engagement between said engaging means and the thrust reversal door part preventing relative movement between said strut and said part to cause all the doors and the struts to pivot together from a retracted position to an extended position reached at the thrust reversal position of the upstream and downstream portions, whereby the thrust reversal doors in the extended position substantially close the duct downstream of the gap to cause gas passing through the duct to pass through the gap thereby reversing the thrust of the gas.

2. An engine according to claim 1, wherein one strut is provided for each thrust reversal door, wherein a part of each strut engages with said part of an associated thrust reversal door, one said part comprising a guide and the other said part comprising a member movable in the guide, the member being halted by the guide to prevent relative movement therebetween as the upstream and downstream portions approach the thrust reversal position to cause said pivoting of the thrust reversal doors from the retracted position to the extended position.

3. An engine according to claim 2, wherein the guide is part of the strut and the member is part of the associated thrust reversal door.

4. An engine according to claim 2, wherein each strut includes a hollow tube, said tube ending at a stop at a downstream end of the strut, the interior of said tube forming said guide and wherein said member is connected to the associated thrust reversal door for pivotal movement about an axis parallel to the pivotal axis of the associated thrust reversal door and slides within said hollow tube, the member engaging said stop to prevent relative movement therebetween when the pivot axis of the member is beyond the downstream end of the associated strut to permit relative pivotal movement between the member and the thrust reversal door as the thrust reversal door moves from the retracted to the extended position.

5. An engine according to claim 1, wherein each strut and the associated thrust reversal door are pivotable about axes which are parallel to one another and which are tangential to respective imaginary circles concentric with the axis of the duct and lying in a plane normal to the axis of the duct and wherein the strut and the associated thrust reversal door extend parallel or substantially parallel to the axis of the duct in the retracted position.

6. An engine according to claim 1, wherein each thrust reversal door has associated therewith a latch which connects the associated thrust reversal door to the downstream portion to maintain the associated thrust reversal door in said retracted position until, as the upstream and downstream portions approach said thrust reversal position, the latch unlatches to permit movement of said thrust reversal door from the retracted position to the extended position.

7. An engine according to claim 6, wherein each latch comprises a plate pivotally mounted on the associated thrust reversal door and, when latched, so engaging with a pin mounted on the downstream portion that the latch tends to pivot about said pivotal axis, said pivoting movement being resisted by engagement between the latch plate and the associated strut until, as the upstream and downstream portions approach the thrust reversal position, the latch plate disengages from the associated strut, and accordingly pivots about said pivotal axis and disengages from the associated pin to release the associated thrust reversal door for movement from said retracted position to said extended position.

8. An engine according to claim 7, wherein upon return movement of the downstream portion towards the upstream portion to said normal position, the struts and the thrust reversal doors move from said extended position to said retracted position and wherein as the thrust reversal doors reach said retracted position each pin on the downstream portion engages with an associated cam surface on the latch plate over which the pin rides into engagement with the latch, each strut, at the same time, engaging with said latch plate to prevent rotation thereof.

9. An engine according to claim 1, wherein a plurality of hydraulic actuators are provided, each hydraulic actuator having a fixed part connected to the upstream portion and a moveable part connected to the downstream portion whereby operation of the actuators moves the upstream and downstream portions between said normal and thrust reversal positions.

10. An engine according to claim 9, wherein said actuators extend in a direction parallel to but spaced from the axis of the duct.

11. An engine according to claim 1, wherein a plurality of cascades of vanes are provided which extend substantially parallel to but spaced from the axis of the duct from the downstream end of the upstream portion of which, in the normal position of the upstream and downstream portions, are received within the downstream portion on which, in the thrust reversal position of the upstream and downstream portions, are arranged within said gap, the vanes including a plurality of parallel spaced arcuate vanes lying in parallel planes normal to the axis of the duct which arcuate vanes, in use, in the thrust reversal position of the upstream and downstream portions, deflect gas passing through the gap towards the upstream end of the duct and over the outer surface of the duct.

12. An engine according to claim 1, wherein the casing comprises a by-pass fan casing and wherein the duct is defined between said casing and a engine casing.

13. An engine according to claim 1, wherein the casing comprises an exhaust of the engine and wherein the duct is defined between said casing and a centre body within said exhaust.

* * * * *